US010538065B2

(12) United States Patent
Pynnönen et al.

(10) Patent No.: US 10,538,065 B2
(45) Date of Patent: Jan. 21, 2020

(54) COMPOSITE PRODUCT AND A PROCESS FOR PRODUCING SAID PRODUCT

(71) Applicant: Stora Enso OYJ, Helsinki (FI)

(72) Inventors: Janne Pynnönen, Lempäälä (FI); Duncan Mayes, Helsinki (FI)

(73) Assignee: Stora Enso OYJ, Helsinki (FI)

( * ) Notice: Subject to any disclaimer, the term of this patent is extended or adjusted under 35 U.S.C. 154(b) by 71 days.

(21) Appl. No.: 15/571,307

(22) PCT Filed: May 4, 2016

(86) PCT No.: PCT/IB2016/052532
§ 371 (c)(1),
(2) Date: Nov. 2, 2017

(87) PCT Pub. No.: WO2016/181258
PCT Pub. Date: Nov. 17, 2016

(65) Prior Publication Data
US 2018/0111161 A1    Apr. 26, 2018

(30) Foreign Application Priority Data
May 8, 2015  (SE) ..................... 1550600

(51) Int. Cl.
| B32B 21/10 | (2006.01) |
| B27N 7/00 | (2006.01) |
| B32B 21/08 | (2006.01) |
| B29C 70/12 | (2006.01) |
| D21H 11/18 | (2006.01) |
| B32B 27/32 | (2006.01) |
| B32B 27/34 | (2006.01) |
| B32B 27/36 | (2006.01) |
| B32B 27/20 | (2006.01) |
| B27N 9/00 | (2006.01) |
| B32B 23/02 | (2006.01) |

(52) U.S. Cl.
CPC .............. B32B 21/10 (2013.01); B32B 23/02 (2013.01)

(58) Field of Classification Search
CPC ......... B32B 21/10; B32B 21/08; B32B 23/02; B32B 27/20; B32B 27/308; B32B 27/32; B32B 27/34; B32B 27/36; B32B 2250/02; B32B 2250/03; B32B 2250/40; B05D 1/26; B05D 3/0218; B05D 7/06; B05D 2602/00; B27K 5/0085; B29C 70/12; D21H 11/18
USPC ........................................................ 428/535
See application file for complete search history.

(56) References Cited

U.S. PATENT DOCUMENTS

2004/0142157 A1 * 7/2004 Melkonian ............... B32B 5/18
                                                          428/292.1
2005/0106406 A1   5/2005 Curtis et al.

FOREIGN PATENT DOCUMENTS

| CN | 103910909 | 7/2014 |
| CN | 104228236 | 12/2014 |
| FR | 2930473 | 10/2009 |
| NZ | 225556 | 2/1992 |
| WO | 1996015077 | 5/1996 |
| WO | 2007057029 | 5/2007 |
| WO | 2008155466 | 12/2008 |
| WO | 2012035192 | 3/2012 |

OTHER PUBLICATIONS

Kaboorani, Alireza and Faezipour, Mehdi. "Effects of Wood Preheat Treatment on Thermal Stability of HDPE Composites." Journal of Reinforced Plastics and Composites. 2009. vol. 28, No. 24, pp. 2945-2955.
Kaboorani, Alireza and Englund, Karl R. "Water Sorption and Mechanical Performance of Preheated Wood/Thermoplastic Composites." Journal of Composite Materials. 2011. vol. 45, No. 13, pp. 1423-1433.
International Search Authority, International Search Report, PCT/IB2016/052532, dated Nov. 17, 2016.
International Search Authority, Written Opinion of the International Search Authority, PCT/IB2016/052532, dated Nov. 17, 2016.
Supplemental European Search Report, European Patent Office, dated Nov. 28, 2018.
Keru et al., Civil Engineering Materials, p. 69.

* cited by examiner

*Primary Examiner* — William K Cheung
(74) *Attorney, Agent, or Firm* — Greer, Burns & Crain Ltd.

(57) ABSTRACT

The present invention relates to a composite product comprising a thermally modified solid wood component coated with a layer of a composite material which composite material comprises thermally modified cellulosic material and a polymer. The invention also relates to a process for producing said composite product.

21 Claims, No Drawings

COMPOSITE PRODUCT AND A PROCESS FOR PRODUCING SAID PRODUCT

This application is a U.S. National Phase under 35 U.S.C. § 371 of International Application No. PCT/IB2016/052532, filed May 4, 2016, which claims priority under 35 U.S.C. §§ 119 and 365 to Swedish Application No. 1550600-9, filed May 8, 2015.

FIELD OF THE INVENTION

The present invention relates to a composite product comprising a thermally modified solid wood component coated with a layer of a composite material which composite material comprises thermally modified cellulosic material and a polymer.

BACKGROUND

Many wood species that are untreated are very susceptible to influences caused by the external environment. Untreated wood that is exposed to moisture and/or soil for sustainable periods of time will become weakened by attacks by various types of microorganisms or insects. It is therefore of importance to treat the less durable wood in order to increase its resistance against moisture and fungal attack. In addition wood which is exposed to Ultra Violet radiation is susceptible to discoloration and deterioration.

There exist a number of different treatment methods which will increase the resistance of wood. Chemical treatments of wood in order to increase the biological durability and strength have been used for a long time. Many different chemicals may be added. These chemicals are normally called fungicides and they will provide long-term resistance to organisms that cause deterioration of the wood. If it is applied correctly, it can extend the productive life of timber by five to ten times.

Another known method to improve the resistance of wood is to treat the wood at high temperatures to thermally modify the wood. During heat modification, certain organic compounds found in the wood will be removed and thereby decreases the possibility for fungi and rot to thrive on the wood. Thus, by heating wood to a certain temperature, it may be possible to make the ligno-cellulosic fibers less appetizing to fungi and insects. Heat modification can also improve the properties of the wood with respect to moisture both liquid and humidity, i.e. lower equilibrium moisture content, less moisture deformation, and improved weather resistance. One potential downside of thermally modified wood is the reduction in strength both in bending strength and surface hardness as a result of the modification process which might reduce the useful service life of the material.

Thus, there is also a need to further protect thermally modified wood against environmental influences. Today the most common way to protect solid wood products is by applying a polymer coating to the surface of the wood product. The most commonly used polymer coating is conventional paints and coatings available from both hardware stores and industrial producers. These coatings can be applied by hand or in a factory environment and are normally based on first applying a base (primer) coating and then one or two additional over coat layers to build a protective film on the surface of the substrate. This kind of coating is susceptible to the changing climatic conditions and over time erodes, cracks or peels from the substrate, leading to a need for periodic remedial maintenance. Another known method is to apply a layer of polyvinyl chloride (PVC) polymer on or around a solid wood product which is described in WO2007057029A1. A problem when coating solid wood, either if it is thermally modified wood or normal solid wood (kiln dried wood), with a polymer is dimensional change and interfacing strength between the substrate and polymer, i.e. the dimension of the solid wood and/or the coated polymer layer changes during time at differing rates which causes stresses at the point of interface which can lead to eventual deterioration in performance unless the wood substrate is fully encapsulated.

For standard wood fiber polymer composites (WPC's), a common problem is creep due to both the high weight and thermoplastic nature of the material based on fiber, thermoplastic resins and additives. Creep can be both weight, heat and moisture induced and often limits the use of standard wood fiber polymer composites from being used in more detailed and challenging applications where longer spans are needed and the products are required to carry their own weight such as in a cladding or façade board.

There is thus a need for an improved composite product comprising solid wood and a fiber polymer composite coating.

SUMMARY OF THE INVENTION

It is an object of the present invention to provide a composite comprising a solid wood component coated with a fiber polymer layer having improved properties, such as reduced tendency to creep and improved adhesion between the polymer coating and the solid wood component.

Another object of the present invention is to provide a process for producing said composite in an easy and efficient way.

These objects and other advantages are achieved by the product and the process according to the independent claims. The present invention relates to a composite product comprising a thermally modified solid wood component wherein at least one side of the solid wood component is coated with a layer of a composite material which composite material comprises thermally modified cellulosic material and a polymer.

The composite material may comprise less than 50% by weight of thermally modified cellulosic material, preferably between 20-45% by weight and even more preferably between 20-30% or between 15-25% by weight of thermally modified cellulosic material.

The thermally modified cellulosic material may have a particle size below 1 mm, preferably below 0.50 mm and even more preferably below 0.25 mm or below 0.1 mm. It is preferred that the cellulosic material has a small size since a more even dispersion and distribution of the cellulosic material in the composite material is achieved. If the thermally modified cellulosic material is in the form of cellulosic fibers, the fibers preferably has a fiber length below 1 mm, preferably below 0.50 mm and even more preferably below 0.25 mm or below 0.1 mm.

The thermally modified cellulosic material may be in the form of a powder. Thus, the thermally modified cellulosic material may comprise thermally modified cellulosic fibers that have been mechanically treated to a powder. The size of the cellulosic material is of importance in order to be able to achieve composite material where the cellulosic material is evenly distributed. It was found that if the cellulosic material is in the form of a powder it is easy to achieve a good dispersion and mixture with the polymer.

The thermally modified cellulosic material may be thermally modified microfibrillated cellulose (MFC). It has been found that by using thermally modified MFC the mechanical properties of the composite material is improved. Also the flow properties of the composite material are improved making it easier to process the material. Furthermore, it is believed that the thermal modification of MFC may improve the dispersability of the MFC into the polymer matrix and reduce the equilibrium moisture content which improves further the dimensional stability of the composite product.

The polymer may be a high melt polymer having a melting temperature above 180° C. The polymer may be polyethylene terephthalate (PET). By the present invention it has been found possible to use high melt polymers in composite materials for the coating of thermally modified solid wood since thermally modified solid wood is more temperature resistant compared to normal kiln dried solid wood components/products, this is due to the absence of resins and volatiles which would normally exude at temperatures over 160° C.

The layer of the composite material preferably has a thickness between 1-5 mm. Too thick layer will cause problems with creep. Also, it is not economically beneficial to have too thick layer.

The solid wood component and/or the cellulosic fibers have been thermally modified by heat treatment preferably at a temperature between 160-250° C., preferably between 200-230° C. at atmospheric pressure or at a temperature above 120° C. at elevated pressure.

Two or more sides of the solid wood component may have been coated with a layer comprising the composite material. It may be preferred that the entire solid wood component has been coated with a layer comprising the composite material.

It may also be possible that at least one side of the solid wood component has been coated with more than one layer comprising the composite material. In this way it is possible to produce a composite product comprising more than one layer of composite material. The layers may consist of different kind of composite materials which make it possible produce a composite product having improved properties.

The present invention also relates to a process for producing a composite product which process comprises the steps of: providing a thermally modified solid wood component, providing a composite material comprising thermally modified cellulosic material and a polymer, feeding said composite material to an extruder, conveying said modified solid wood component through the extruder, and applying a layer of the composite material to form a coating layer on at least one side of the solid wood component while it is being conveyed through the extruder. It is thus possible to produce an improved composite product in an easy way.

The temperature of the composite material being applied to the solid wood material in the extruder is preferably above 180° C.

Two or more sides of the solid wood component are preferably being coated with a layer of the composite material. It may even be preferred that the entire solid wood material, i.e. all sides of the product, is being coated with a layer of the composite material.

DETAILED DESCRIPTION

The invention relates to a composite product comprising a thermally modified solid wood component wherein at least one side of the solid wood component is coated with a layer of a composite material which composite material comprises thermally modified cellulosic material and a polymer. It has surprisingly been found that by coating a thermally modified solid wood component with a composite material comprising thermally modified cellulosic material and a polymer, the problem with creep has been significantly reduced compared with the existing fiber thermoplastic composites and coated solid wood products available on the market. This is due to the fact that thermally modified solid wood is able to carry its own weight much better without creep change compared to normal wood fiber thermoplastic composites and normally kiln tried solid wood components. In addition to weight induced creep, the invention is far less susceptible to creep caused by changing moisture and surface heat generated from the sun or freezing conditions. Thermally modified solid wood is a very stable material that has good biological durability characteristics and it also has good strength to weight ratio.

Furthermore, by combining thermally modified solid wood components with a composite comprising thermally modified cellulosic material and a polymer it has been found that the adhesion between the composite material and the solid wood component is improved. This is due to the similar nature of the materials, leading to greater compatibility and higher performance both in stability, durability and overall aesthetics. In this respect, thermally modified cellulosic material can be used in composite formulations as an adhesion promoter when being in contact with a thermally modified solid wood component. Adhesion could be further improved by surface treatments, modifications of the solid wood material or by increasing the contact area between the composite material and the solid wood component through design, e.g. by applying grooves or patterns on the surface of the solid wood which leads to an improved mechanical adhesion. Other surface modifications could include surface treatments which enhance the chemical bonding between the solid wood component and the composite material, such as thermally modification of the surface of the wood.

In one embodiment of the present invention, the thermally modified solid wood component is treated with a fire retardant prior to coating with a composite material, which composite material comprises thermally modified cellulosic material and a polymer. In one embodiment of the present invention, the fire retardant is MP FR Ultra.

Also, the composite material preferably comprises high melt temperature polymers such as PET that has a melting temperature above 180° C., preferably above 200° C. The use of high melt polymers in composites for coating normal solid wood (kiln dried wood) has not been possible due to the risk of burning the solid wood during the extrusion process. Thus, by using thermally modified solid wood higher temperatures up to 250° C. in the extruder can be used as the solid wood is not having the same level of extractives and VOCs which could initiate burning. Besides polyethylene terephthalate (PET) other polymers having high melting temperatures such as polyamide (PA), preferably polyamide 6 or 610, polymethyl metacrylate (PMMA), polypropylene (PP) and/or high density polyethylene (HDPE) can be used.

With coated it is meant that the composite material covers and is attached to the solid wood component. The coating may be done in an extruder or any other conventional known machine used for applying a layer of a fiber-composite material to a solid wood component.

With thermally modified solid wood component it is meant a solid wood component of any kind of wood species that has been thermally treated at an increased temperature between 160-250° C. at atmospheric pressure or at a temperature above 120° C. at an elevated pressure of above 1 bar.

With thermally modified cellulosic material it is meant cellulosic material that have been thermally treated at an increased temperature between 160-250° C. at atmospheric pressure or at a temperature above 120° C. at an elevated pressure of above 1 bar. The cellulosic material can be thermally treated cellulosic fibers of any kind of cellulosic wood material. The thermally modified cellulosic fibers may be further treated in order to form said thermally modified cellulosic material, e.g. mechanically treated and/or chemically treated. The mechanical treatment of the thermally treated cellulosic fibers may be done in order to form a powder and one of the advantages with mechanically treating thermally modified cellulosic fibers are that they easily break into very small particles with unique shape. Size and shape are key parameters influencing numerous composite properties, such as strength and water uptake. Due to the very fine particle size and lack of resin compared to what is found in normal dried wood the risk of fiber bundling is greatly reduced when adding the thermally modified cellulosic material to the polymer to form the composite material, which in turn leads to more even dispersion and distribution. The chemical treatment of the thermally treated cellulosic fibers may be done in order to improve the reactivity of the material. It may also be possible to thermally treat cellulosic fibers that have been mechanically or chemically treated, e.g. to thermally treat cellulosic fiber that have been grinded into a powder.

The modified cellulosic material can be thermally modified microfibrillated cellulose (MFC). Microfibrillated cellulose is also known as nanocellulose. It is a material typically made from wood cellulose fibers, both from hardwood or softwood fibers. It can also be made from microbial sources, e.g. seaweed fermented fibers, agricultural fibers such as wheat straw pulp, bamboo or other non-wood fiber sources. In microfibrillated cellulose the individual microfibrils have detached from each other. A microfibrillated cellulose fibril is very thin (e.g. a width of 5-200 nm) and the length is normally between 100 nm to 10 µm. However, the microfibrils may also be longer, for example between 10-200 µm, even lengths of 2000 µm can be found due to wide length distribution. Fibers that have been fibrillated to the short length and that have microfibrils on the surface is also included in the definition.

It may also be possible to add microfibrillated cellulose as an additive to the composite material together with the modified cellulosic material, i.e. non-heat modified MFC. The non-modified MFC may be added in order to increase the mechanical properties of the composite material, e.g. strength properties such as surface hardness, scratch resistance, erosion resistance, bending strength and impact strength. Also, the flow ability of the composite material is improved if MFC is added which makes it easier to handle and process the material.

The thermal modification of the solid wood component and/or the thermally modified cellulosic material is done at a temperature of between 160-250° C., preferably of between 180-230° C., at atmospheric pressure. If temperatures in the upper range are used, a larger amount of components, e.g. hemicellulose, is removed or degraded which means that the weight of the thermally modified wood component is reduced. The thermal modification may last for at least two hours, preferably for about 4 hours. The parameters chosen for the thermally modification of the wood component and/or the cellulosic fibers depends on the wood used and on the end use of the thermally modified wood component. It is also possible to thermally modify the solid wood component at a temperature above 120° C. but at an increased pressure, i.e. a pressure above 1 bar, preferably between 1.5-13 bar.

The composite material may also comprise additives that will enhance the performance and process parameters of the composite. Possible additives may be lubricants, coupling agents, pigments, uv-stabilizers or blockers and/or fillers. In one embodiment of the present invention, the composite material comprises a flame retardant.

The present invention also relates to a process for producing a composite product which process comprises using an extruder to feed the composite material to the solid wood component. It is possible to use any kind of extruder for applying a layer of the composite material to the solid wood compound.

The solid wood component can be of any kind of wood, e.g. softwood or hardwood or even bamboo.

The produced composite product can be used for the production of many different products, such as cladding, decking, window and door profiles, light poles, jetties, joinery, furniture etc.

EXAMPLES

Example 1

In this experiment, the properties of normal pine wood vs thermally modified pine wood when coated with a composite comprising normal pine saw dust or thermally modified saw dust were compared.

The wood boards were dried prior to coating. It was found that the normal pine wood board was clearly warped after drying, whereas no warp effect was noticeable on the thermally modified pine board.

The composite had the following composition:

| Component | Concentration (%) |
|---|---|
| Pine saw dust <0.5 mm | 19 |
| g-PET Genius 72 | 74 |
| Colourant, UV stabilizers | 5 |
| Lubricant | 2 |

Compounding was carried out using a Cincinatti Milacron CM45 compounder at 206° C. (normal pine saw dust) or using a NCT55 compounder at 195° C. (thermally modified pine wood saw dust).

The melt volume flow rate of the coating material was determined. For the composite comprising normal pine saw dust the average melt volume flow rate was 16 cm$^3$/10 min at 190° C. and 445 cm$^3$/10 min at 230° C. For the composite comprising thermally modified pine saw dust the average melt volume flow rate was 88 cm$^3$/10 min at 230° C.

It was found that it was not feasible to carry out the extrusion of the normal pine wood with the composite comprising normal pine saw dust at 206° C. During extrusion, the coating material was flowing against the extrusion direction and bubbles were formed. Extrusion of the thermally modified pine wood with the composite comprising thermally modified pine saw dust at 206° C. worked well.

Example 2

In this experiment, the effects of submerging three different boards into boiling water were determined.

The following samples were prepared:
A. Normal pine coated with a composite comprising thermally modified pine saw dust.
B. Thermally modified pine coated with a composite comprising thermally modified pine saw dust.
C. Thermally modified pine to which a layer of flame retardant was applied, followed by coating with a composite comprising thermally modified pine saw dust.

The composite had the following composition:

| Component | Concentration (%) |
| --- | --- |
| Thermally modified pine saw dust <0.5 mm | 19 |
| g-PET Genius 72 | 74 |
| Colourant, UV stabilizers | 5 |
| Lubricant | 2 |

In the boiling test, each sample was submerged into boiling water for 5 hours.

The following results were obtained:

TABLE 1

| | Sample A | Sample B | Sample C |
| --- | --- | --- | --- |
| Average water absorption [%] | 90 | 65 | 45 |
| Average change in thickness [%] | 26 | 13 | 14 |
| Average change in length [%] | 0.35 | 0.20 | 0.13 |
| Average change in width [%] | 6.9 | 3.1 | 3.4 |

Upon a visual inspection of the boards after the end of the experiment the following was noted:

Sample A: Delamination of the coating, poor adhesion of the coating to the solid wood. Coating essentially loose from the solid wood. The board was highly distorted.

Sample B: Limited delamination, coating adhered well to the solid wood. The delamination seen was only at the cutting edges. The thermally modified pine board remained undistorted.

Sample C: Essentially no delamination observed. The thermally modified pine board remained undistorted.

Example 3

In this experiment, the same samples were prepared as in Example 3. The samples were stored in water at room temperature for up to 28 days. The water absorption, expansion-thickness, expansion-width and expansion-length was determined for each sample after 1 day, 7 days and 28 days of storage. The following results were obtained:

TABLE 2

Water absorption.

| Average water absorption [%] | Sample A | Sample B | Sample C |
| --- | --- | --- | --- |
| 1 day | 25 | 8 | 5 |
| 7 days | 38 | 20 | 19 |
| 28 days | 55 | 36 | 30 |

TABLE 3

Expansion-thickness.

| Average expansion-thickness [%] | Sample A | Sample B | Sample C |
| --- | --- | --- | --- |
| 1 day | 8.8 | 2.8 | 2.0 |
| 7 days | 12.0 | 4.7 | 3.5 |
| 28 days | 12.5 | 5.1 | 4.4 |

TABLE 4

Expansion-width.

| Average expansion-width [%] | Sample A | Sample B | Sample C |
| --- | --- | --- | --- |
| 1 day | 1.0 | 0.7 | 0.7 |
| 7 days | 1.6 | 1.2 | 1.4 |
| 28 days | 1.9 | 1.5 | 1.6 |

After drying, a visual inspection of the samples was performed. The following was observed:

Sample A: upon drying the wood shrinks, causing delamination and distortion.

Sample B: no delamination or distortion observed.

Sample C: no delamination or distortion observed.

TABLE 5

Expansion-length.

| Average expansion-length [%] | Sample A | Sample B | Sample C |
| --- | --- | --- | --- |
| 1 day | 0.10 | 0.06 | 0.04 |
| 7 days | 0.15 | 0.07 | 0.06 |
| 28 days | 0.18 | 0.09 | 0.09 |

Example 4

In this experiment, a flame retardant was added to the composite coating. Alternatively, a the board was treated with a fire retardant prior to coating.

The coating composition described in example 1 above were used, with g-PET and fiber partially replaced with a flame retardant.

Flame treatment tests (simulation of SBI test, 3 minutes flame treatment) were performed and the following results were obtained:

TABLE 6

Flame treatment test.

| Board | Coating | Burning after flame removal | Self extinguishing |
| --- | --- | --- | --- |
| Thermally modified pine | Thermally modified pine saw dust | Yes | No |
| Thermally modified pine, treated with fire retardant | Thermally modified pine saw dust | Approximately 1 second | Yes |

TABLE 6-continued

Flame treatment test.

| Board | Coating | Burning after flame removal | Self extinguishing |
|---|---|---|---|
| Thermally modified pine | Thermally modified pine saw dust and flame retardant | Approximately 4 seconds | Yes |

Thus it was found that products comprising thermally modified pine coated with a composite comprising a flame retardant self-extinguished within a few seconds after flame removal. A product comprising thermally modified pine which had been treated with a fire retardant was also found to be self-extinguishing, even when the composite coating did not contain flame retardant.

In view of the above detailed description of the present invention, other modifications and variations will become apparent to those skilled in the art. However, it should be apparent that such other modifications and variations may be effected without departing from the spirit and scope of the invention.

The invention claimed is:

1. A composite product comprising a thermally modified solid wood component wherein at least one side of the solid wood component is coated with a layer of a composite material which composite material comprises thermally modified cellulosic material and a polymer.

2. The composite product according to claim 1 wherein the composite material comprises less than 50% by weight of thermally modified cellulosic material.

3. The composite product according to claim 1 wherein the thermally modified cellulosic material has a particle size below 1 mm.

4. The composite product according to claim 1 wherein the thermally modified cellulosic material is in the form of a powder.

5. The composite product according to claim 1 wherein the thermally modified cellulosic material is thermally modified microfibrillated cellulose.

6. The composite product according to claim 1 wherein the polymer is a high melt polymer having a melting temperature above 180° C.

7. The composite product according to claim 1 wherein the polymer is polyethylene terephthalate (PET).

8. The composite product according to claim 1 wherein the layer of the composite material has a thickness between 1-5 mm.

9. The composite product according to claim 1 wherein the solid wood component and/or the cellulosic fibers have been thermally modified by heat treatment at a temperature between 160-250° C. at atmospheric pressure.

10. The composite product according to claim 1 wherein two or more sides of the solid wood component have been coated with a layer comprising the composite material.

11. The composite product according to claim 1 wherein the entire solid wood component has been coated with a layer comprising the composite material.

12. The composite product according to claim 1 wherein at least one side of the solid wood component has been coated with more than one layer comprising the composite material.

13. The composite product according to claim 1, wherein the solid wood component has been surface treated prior to coating with the composite material.

14. The composite product according to claim 13, wherein the solid wood component has been treated with a fire retardant prior to coating with the composite material.

15. The composite product according to claim 1, wherein the composite material comprises a flame retardant.

16. Process for producing a composite product which process comprises the steps of:
providing a thermally modified solid wood component,
providing a composite material comprising thermally modified cellulosic material and a polymer,
feeding said composite material to an extruder,
conveying said modified solid wood component through the extruder, and
applying a layer of the composite material to form a coating layer on at least one side of the solid wood component while it is being conveyed through the extruder.

17. Process according to claim 16, wherein the temperature of the composite material being applied to the solid wood material in the extruder is above 180° C.

18. Process according to claim 16 wherein two or more sides of the solid wood component are being coated with a layer of the composite material.

19. Process according to claim 16 wherein the entire solid wood, i.e. all sides of the product, are being coated with a layer of the composite material.

20. The composite product according to claim 1 wherein the solid wood component and/or the cellulosic fibers have been thermally modified by heat treatment at a temperature between 200-230° C.

21. The composite product according to claim 1 wherein the solid wood component and/or the cellulosic fibers have been thermally modified by heat treatment at a temperature above 120° C. and at elevated pressure.

* * * * *